Dec. 19, 1933.　　　　B. V. TUCKER　　　　1,940,193
DUMPING VEHICLE
Filed Oct. 19, 1932　　　2 Sheets-Sheet 1

B. V. Tucker Inventor

Attorneys.

Dec. 19, 1933.  B. V. TUCKER  1,940,193
DUMPING VEHICLE
Filed Oct. 19, 1932   2 Sheets-Sheet 2
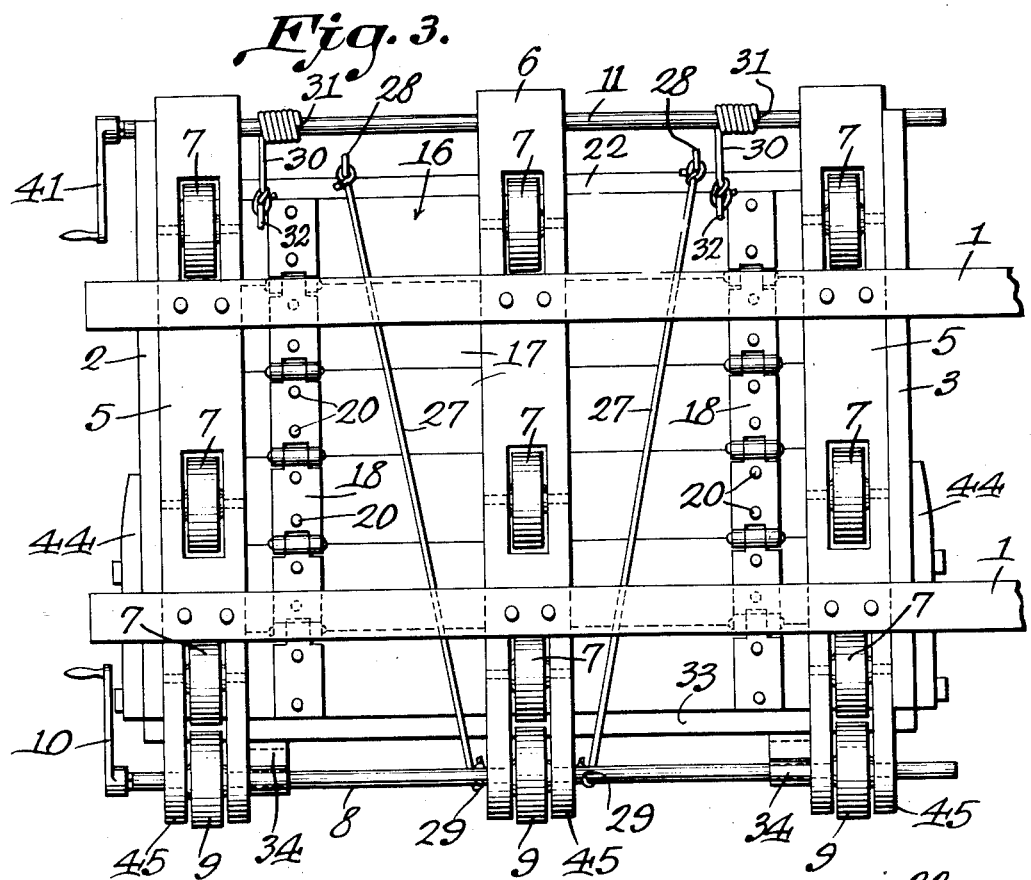
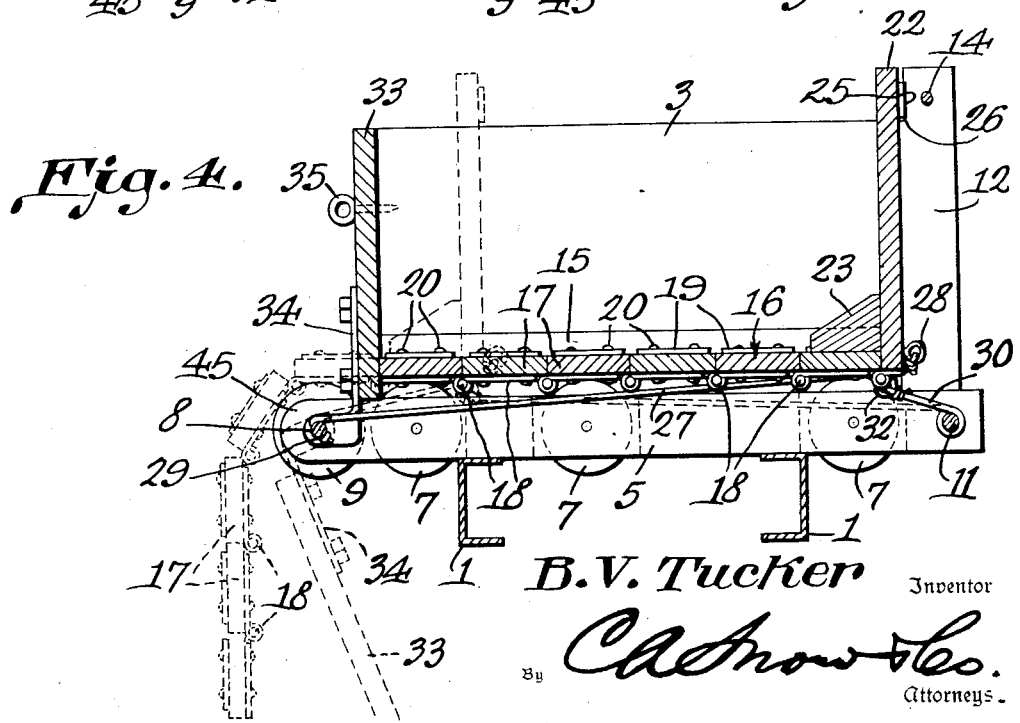
B. V. Tucker Inventor
By C. A. Snow & Co.
Attorneys Patented Dec. 19, 1933

1,940,193

UNITED STATES PATENT OFFICE 1,940,193

DUMPING VEHICLE

Burke Vail Tucker, Nacogdoches, Tex.

Application October 19, 1932. Serial No. 638,606

2 Claims. (Cl. 298—13)

This invention aims to provide a dumping vehicle having a flexible bed, the construction being such that the bed may be moved laterally to discharge the contents of the vehicle, novel means being provided for advancing and retracting the bed.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 3 is a bottom plan;

Fig. 4 is a section on the line 4—4 of Fig. 1.

Figure 2:
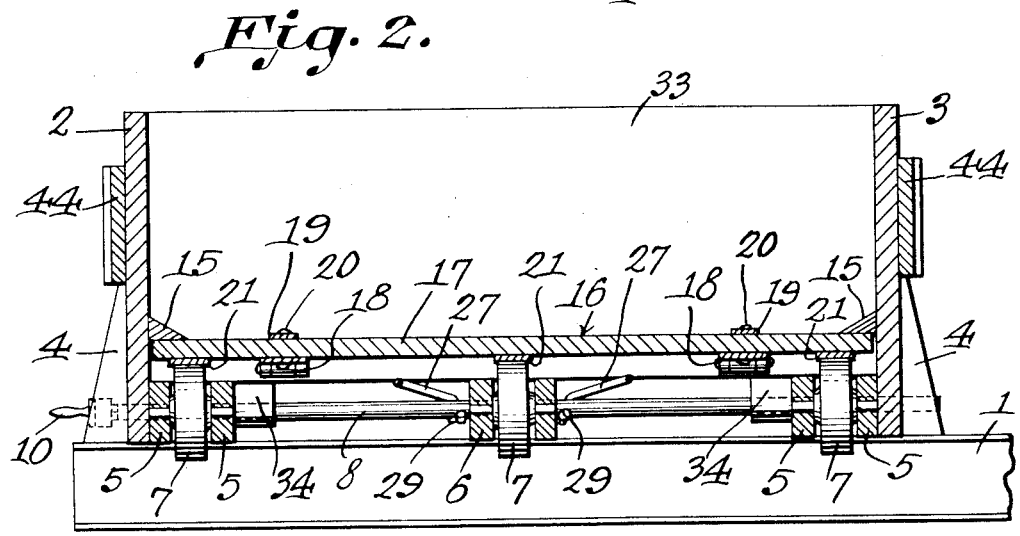
Fig. 2 is a section on the line 2—2 of Fig. 1.

The numeral 1 marks the longitudinal sills of a wagon frame. End walls 2 and 3 extend transversely of the sills 1 and are supported from the sills by buttresses 4 (Fig. 2). At the discharge side of the vehicle, the end walls 2 and 3 are reenforced by cleats 44. Outer supporting beams 5 are disposed transversely of the sills 1 and are secured thereto, just inside of the walls 2 and 3. An intermediate supporting beam 6 is also secured to the sills 1. Rollers 7 are journaled in holes in the beams 5 and 6. A first winding shaft 8 is journaled in the forks 45 of the beams 5 and 6 at one side of the vehicle. Rollers 9 are located in the forks 45, and are journaled on the shaft 8, in alignment with the rollers 7. The operating means for the shaft 8 may be a crank 10 on one end of the shaft. A second winding shaft, marked by the numeral 11 is journaled in the ends of the beams 5 and 6, at the opposite side of the vehicle from the shaft 8. The second winding shaft 11 is operated by any suitable means, such as a crank 41.

Figure 1:
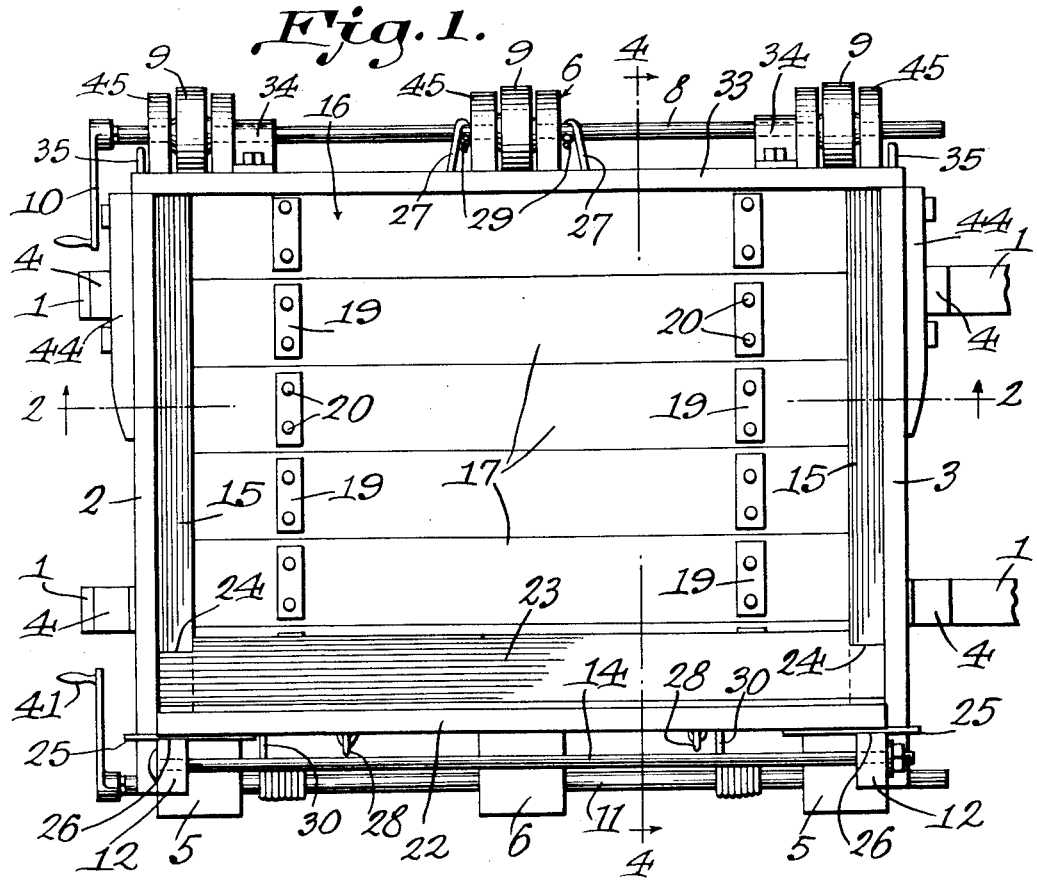
Fig. 1 shows in top plan, a device constructed in accordance with the invention.

Posts 12 are secured to the walls 2 and 3 adjacent to the winding shaft 11. The posts 12 are connected, near to their upper ends, by a tie rod 14. Incline guides 15 are secured to the walls 2 and 3, near to the lower edges thereof. The bed 16 of the vehicle slides underneath the guides 15. The bed 16 of the vehicle comprises slats 17 connected by hinges 18. Anchor plates 19 are disposed on the upper surfaces of the slats 17 and retain the securing elements 20 that hold the hinges 18 in place. On their lower surfaces, the slats 17 of the bed 16 have wear plates 21 adapted to ride along the rollers 7 and 9. The bed of the vehicle, when retracted, is thus supported on the rollers 7. The bed 16 carries a fixed side wall 22. The side wall 22 is "fixed" in the sense that it is secured to one of the terminal slats 17 of the bed, but the side wall 22 advances with the bed, to dump the load. The side wall 22 is secured to one of the terminal slats of the bed, as shown in Fig. 4, by means of a brace block 23 which is notched as shown at 24 in Fig. 1, to slide over the guides 15. At its ends, the wall 22 has outwardly projecting arms 25, adapted to ride along the upper edges of the end walls 2 and 3. As shown at 26 in Fig. 4, the posts 12 are cut away to receive the arms 25, when the bed is retracted and in a position to receive a load.

Converging flexible elements 27 extend along the under surface of the bed 16, as shown in Fig. 3. At one end, the flexible elements 27 are secured at 28 to the wall 22. The opposite ends of the flexible elements 27 are secured at 29 to the shaft 8. The flexible elements 27 are adapted to be wound about the shaft 8. Flexible elements 30 are provided. Their outer ends are secured at 31 to the shaft 11. The flexible elements 30 are adapted to be wound about the shaft 11. The inner ends of the flexible elements 30 are secured at 32 to the outermost slat 17 of the bed 16.

A movable side wall 33 is disposed opposite to the side wall 22. The side wall 33 has straps 34, by which the side wall 33 is hinged to the shaft 8 for vertical swinging movement. The side wall 33 is held in the vertical position of Fig. 4 by means of latches 35 mounted on the walls 2 and 3 and adapted to engage the wall 33.

With the parts in the position shown in Fig. 4, the vehicle is loaded, the material being carried on the slats 17 of the bed 16, between the end walls 2 and 3, and between the side walls 33 and 22.

When it is desired to dump the load, the latches 35 are cast off, and the movable side wall 33 is swung downwardly, as shown in dotted line in Fig. 4 or otherwise. This can be done because the straps 34 are mounted to swing on the shaft 8, the side wall 33, thus, being hinged to the shaft 8. The shaft 8 is rotated by means of the crank 10. The flexible elements 27 are wound on the shaft 3, and the entire bed is advanced, the slats 17 of the bed riding over the rollers 9 and falling into the depending position shown in dotted line at the left hand side of Fig. 4, the load being discharged at a distance from the side of the wagon body if the bed is extended outwardly from the dotted line position of Fig. 4.

In order to restore the parts to the position of Fig. 4, the bed is retracted, the retraction of the bed being brought about by rotating the shaft 11 through the instrumentality of the crank 41, the flexible elements 30 being wound about the shaft, as shown in Fig. 3. When the bed is retracted, to the position of Fig. 4, the wall 33 is swung up into a vertical position, and is held in place by the latches 35.

Having thus described the invention, what is claimed is:

1. A wagon body comprising spaced ends, a flexible bed slidably mounted between the ends, a first wall secured to the bed, a second wall disposed opposite to the first wall, the ends and the walls cooperating to define a box; means under the control of an operator for advancing the bed and the first wall to dump the load which is on the bed, said means embodying a shaft journaled at one side of the body, means for rotating the shaft, and a flexible connection between the shaft and the bed; mechanism for mounting the second wall movably to dispose it out of the way of the load that is being dumped, said mechanism being a hinge connecting the said wall with the said shaft, and means under the control of an operator for retracting the bed and the first wall, to return the bed to load-receiving position.

2. A wagon body comprising a frame, a flexible load-carrying bed, means for supporting the bed slidably in a substantially horizontal position to form the bottom of the wagon body, an upstanding wall hinged to the body and foldable to a position below the bed and means for advancing and retracting the bed, the bed being free at one end, the space below and about the free end of the bed being open when said wall is folded downwardly, whereby the operator can extend the free end of the bed outwardly, with respect to the folded wall, at a downwardly inclined acute angle to the horizontal, thereby to space the point of deposit outwardly of and away from the body, and the space above the bed, within the contour of the body, being open, whereby the load may move upon and with the bed to a point of deposit represented by the extremity of the free end of the bed and spaced outwardly from the side of the bed far enough to make a practical and useful difference in the place of deposit.

BURKE V. TUCKER.